United States Patent
Tsukui

(10) Patent No.: US 10,158,147 B2
(45) Date of Patent: Dec. 18, 2018

(54) SEALED BATTERY MANUFACTURING METHOD

(71) Applicant: TOYOTA JIDOSHA KABUSHIKI KAISHA, Toyota-shi, Aichi-ken (JP)

(72) Inventor: Akira Tsukui, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 422 days.

(21) Appl. No.: 14/897,107

(22) PCT Filed: Jun. 3, 2014

(86) PCT No.: PCT/IB2014/000927
§ 371 (c)(1),
(2) Date: Dec. 9, 2015

(87) PCT Pub. No.: WO2014/199208
PCT Pub. Date: Dec. 18, 2014

(65) Prior Publication Data
US 2016/0133993 A1    May 12, 2016

(30) Foreign Application Priority Data

Jun. 11, 2013  (JP) .................. 2013-122905

(51) Int. Cl.
| | | |
|---|---|---|
| H05K 1/02 | (2006.01) | |
| G06F 17/50 | (2006.01) | |
| H01M 10/42 | (2006.01) | |
| H01M 10/0525 | (2010.01) | |
| H01M 2/36 | (2006.01) | |
| H01M 6/50 | (2006.01) | |

(52) U.S. Cl.
CPC ... *H01M 10/4228* (2013.01); *H01M 10/0525* (2013.01); *H01M 2/367* (2013.01); *H01M 6/50* (2013.01); *H01M 6/5083* (2013.01); *Y10T 29/49108* (2015.01); *Y10T 29/53135* (2015.01)

(58) Field of Classification Search
CPC ...... H01M 2/367; H01M 6/50; H01M 6/5083; H01M 10/0525; H01M 10/4228; Y10T 29/49004; Y10T 29/49108; Y10T 29/4911; Y10T 29/53022; Y10T 29/53135
See application file for complete search history.

(56) References Cited

U.S. PATENT DOCUMENTS

| | | | | |
|---|---|---|---|---|
| 6,706,440 | B1 * | 3/2004 | Takimoto | H01M 2/361 141/241 |
| 7,150,936 | B2 * | 12/2006 | Tukawaki | H01M 2/36 429/90 |
| 2006/0260713 | A1 * | 11/2006 | Pyszczek | H01G 9/08 141/311 R |

FOREIGN PATENT DOCUMENTS

| | | |
|---|---|---|
| JP | 2002-117901 A | 4/2002 |
| JP | 2014-183026 A | 9/2014 |

* cited by examiner

*Primary Examiner* — Peter DungBa Vo
*Assistant Examiner* — Joshua D Anderson
(74) *Attorney, Agent, or Firm* — Sughrue Mion, PLLC

(57) ABSTRACT

A sealed battery manufacturing method includes inserting a supply nozzle (120) into an opening (33) that is opened outwardly, the opening (33) being formed in a battery container (33); and introducing a detection gas (He) into the battery container in such a manner that injection of the detection gas from the supply nozzle (120) is started at a pressure smaller than a predetermined injection pressure, and then an injection pressure of the detection gas (He) is increased by stages until the injection pressure of the detection gas (He) reaches the predetermined injection pressure.

7 Claims, 15 Drawing Sheets

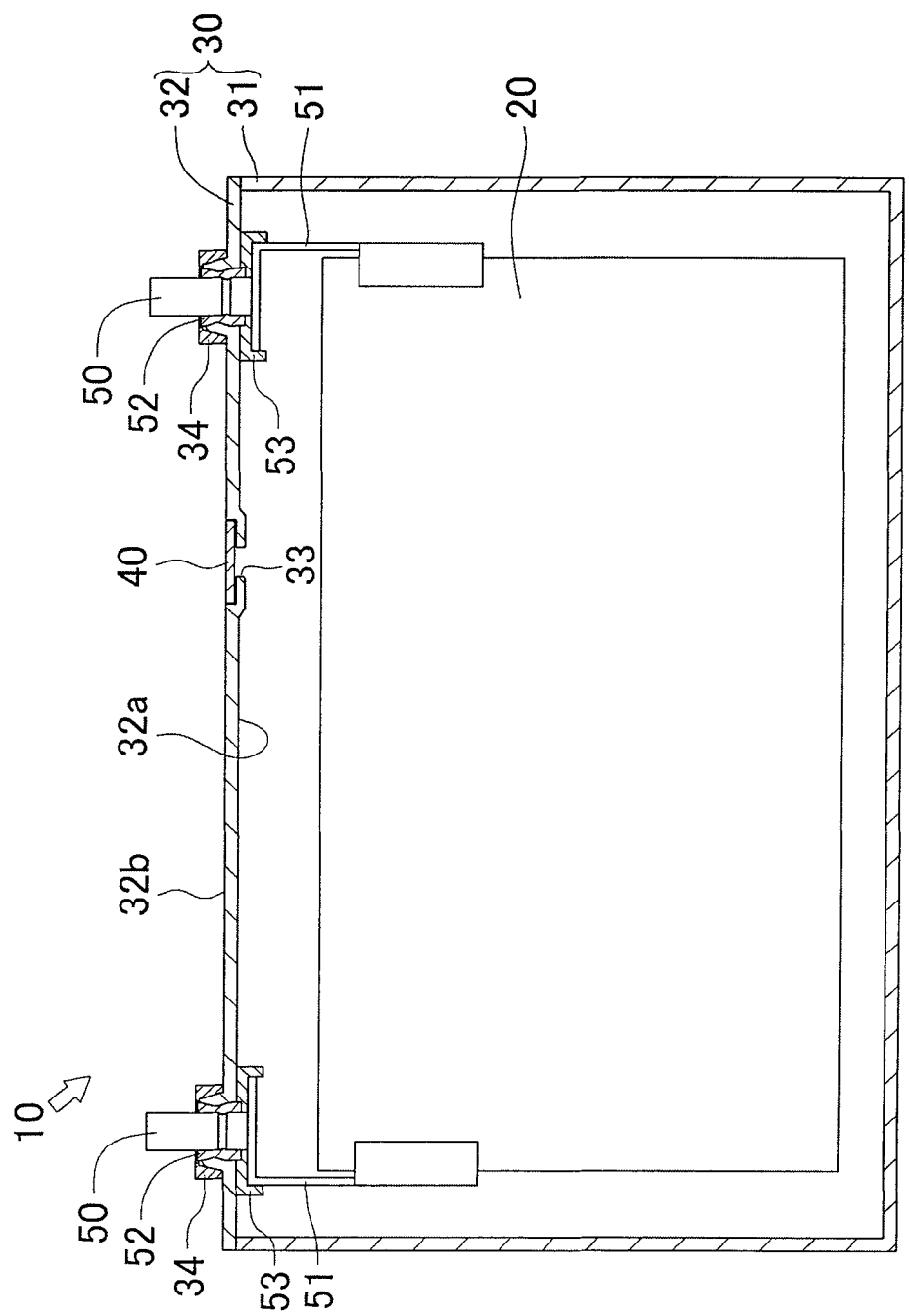

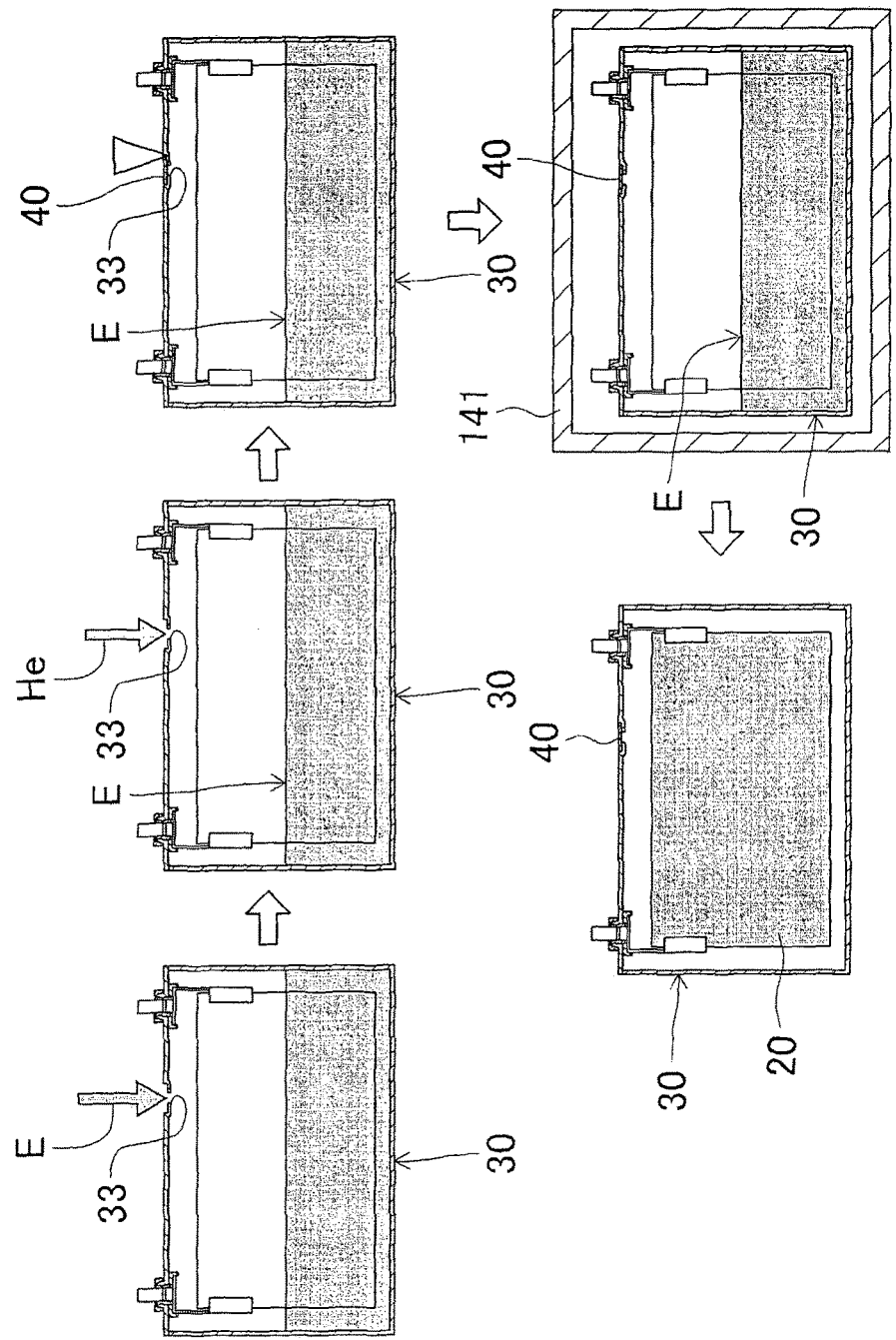

F I G . 6
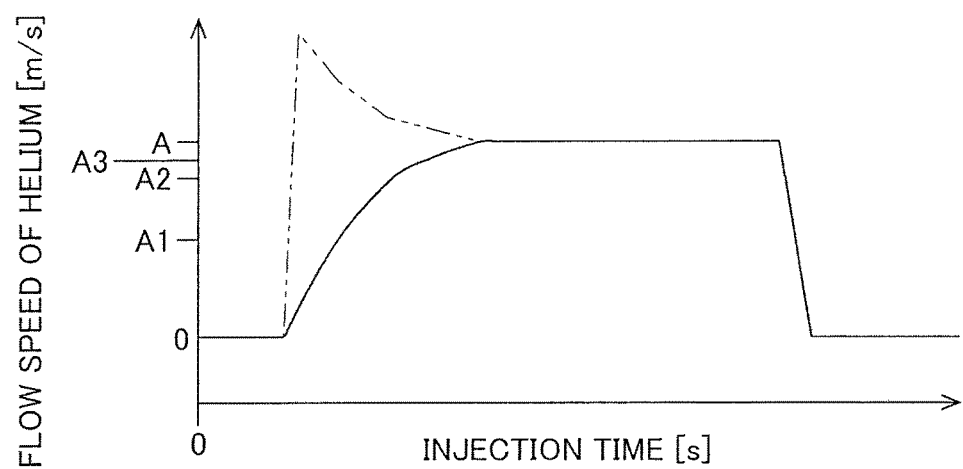

SEALED BATTERY MANUFACTURING METHOD

BACKGROUND OF THE INVENTION

1. Field of the Invention

The present invention relates to a sealed battery manufacturing method performing an introduction step of introducing a detection gas into a battery container from an opening that is opened outwardly.

2. Description of Related Art

Conventionally, in a manufacturing process of a sealed battery, sealing performance of a battery container is inspected for purposes of preventing deterioration of battery performance due to moisture intrusion into the battery container. At this time, in the manufacturing process of the sealed battery, a detection gas (e.g., helium or the like) is introduced into the battery container in advance, so as to check whether or not the detection gas leaks from the battery container. A technique to introduce a detection gas is described in Japanese Patent Application Publication No. 2002-117901 (JP 2002-117901 A), for example.

JP 2002-117901 A describes such a technique that an injection nozzle is attached to an electrolyte injection port, and then electrolyte is injected into a battery can (a battery container) from the injection nozzle and helium is introduced into the battery can. Further, JP 2002-117901 A describes that the injection nozzle is removed from the electrolyte injection port, and the electrolyte injection port is sealed by laser welding means.

JP 2002-117901 A describes a configuration in which helium is introduced from the injection nozzle attached to the electrolyte injection port, that is, a configuration in which helium is introduced from an upper part (outside the battery can) of the electrolyte injection port. Accordingly, before the electrolyte injection port is sealed, much helium, which is lighter than air, leaks from the electrolyte injection port.

As a method for reducing a leakage of helium, the following method is considered. That is, as illustrated in FIG. 14, a nozzle configured to be able to inject helium is inserted into an electrolyte injection port and a magnetic valve for opening and closing a helium supply passage is opened so as to inject helium from the nozzle at a predetermined pressure for a given time. In this case, the predetermined pressure is set to a large pressure to some extent, so that the helium is injected from the nozzle vigorously to such an extent that the helium reaches a position away from the electrolyte injection port.

A pressure inside the battery can is increased due to the helium injection. In view of this, just after the helium injection is started, the pressure inside the battery can is small. In this case, when the helium is injected at the predetermined pressure, the helium at the predetermined pressure is supplied at once right after the helium injection is started, as illustrated in FIG. 14. This causes a flow speed of the helium injected from the supply nozzle becomes fast suddenly, and after that, the flow speed is maintained stably at a constant speed.

In this case, the flow speed of the helium becomes too fast right after the helium is injected and a flow speed of airflow caused in the battery can due to the helium injection and going outside via the electrolyte injection port becomes fast (see an arrow shown inside the electrolyte injection port in FIG. 14). As illustrated in FIG. 15A, the fast airflow may catch the electrolyte attached to an inner side surface of the battery can along the injection nozzle at the time of the injection, and blow off the electrolyte outside the battery can. Accordingly, in this case, when the helium is introduced, the electrolyte may be attached to a peripheral part of the electrolyte injection port on an outer side surface of the battery can (see electrolyte shown in FIG. 15B).

In this case, when the electrolyte injection port is sealed by the laser welding means, its heat is also given to the electrolyte thus attached to the outer side surface of the battery can. The electrolyte attached to the outer side surface of the battery can is vaporized by the heat in a melting portion and expands rapidly to go outside from the melting portion. This causes a molten material (e.g., aluminum or the like) of the battery can to bump.

That is, in this case, poor welding may occur at the time of sealing the electrolyte injection port.

SUMMARY OF THE INVENTION

The present invention provides a sealed battery manufacturing method that is able to reduce a leakage of a detection gas and to prevent occurrence of poor welding.

A sealed battery manufacturing method of an aspect of the present invention includes: inserting a supply nozzle into an opening that is opened outwardly, the opening being formed in a battery container; and introducing a detection gas into the battery container in such a manner that injection of the detection gas from the supply nozzle is started at a pressure smaller than a predetermined injection pressure, and then an injection pressure of the detection gas is increased by stages until the injection pressure of the detection gas reaches the predetermined injection pressure.

The present invention yields effects of reducing a leakage of detection gas and preventing occurrence of poor welding.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is an explanatory view illustrating a general configuration of a battery;

FIG. 2 is an explanatory view illustrating a battery manufacturing process;

FIG. 6 is a view illustrating a relationship between an injection period of helium and a flow speed thereof;

DETAILED DESCRIPTION OF EMBODIMENTS

Figure 3A:
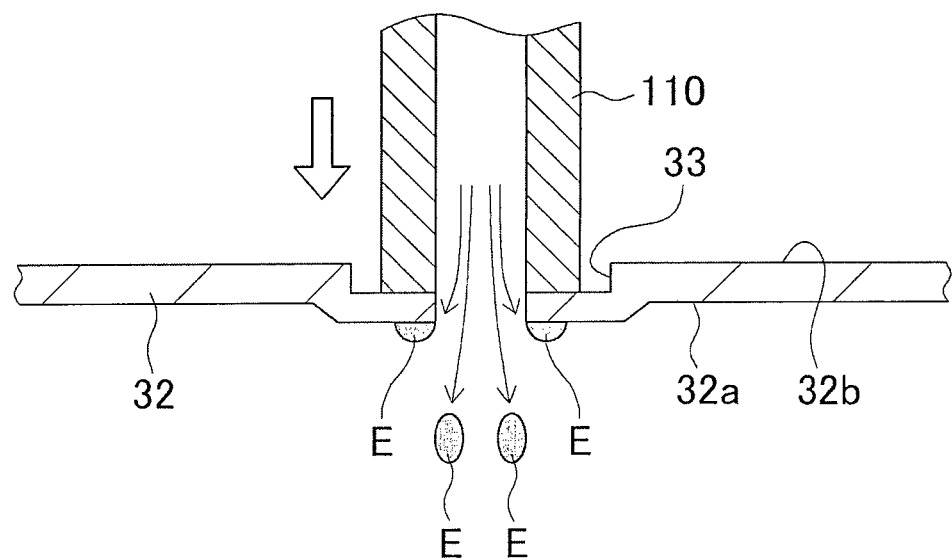
FIG. 3A illustrates a state where electrolyte is being injected.

The following describes a sealed battery manufacturing method (hereinafter just referred to as "manufacturing method") of the present embodiment.

Initially described is a schematic configuration of a battery according to an embodiment of a sealed battery of the present invention with reference to FIG. 1.

A battery 10 of the present embodiment is a sealed lithium ion secondary battery. Note that a target object to which the present invention is applied is not limited to a lithium ion secondary battery, and the present invention is also applicable to the other sealed batteries such as a nickel hydride secondary battery. That is, electrolyte used in the battery 10 may be aqueous electrolyte or non-aqueous electrolyte.

The battery 10 includes a power generation element 20, an outer package 30, a cap 40, and two external terminals 50.

The power generation element 20 is formed by immersing, in electrolyte, an electrode body obtained by laminating or winding a positive electrode, a negative electrode, and a separator. When a chemical reaction is caused in the power generation element 20 at the time of discharge and charge of the battery 10 (strictly, a migration of ions via the electrolyte is caused between the positive electrode and the negative electrode), a current flow occurs.

The outer package 30, which is a battery container, is a rectangular-column shaped can made of a metallic material such as aluminum, and is formed into a generally rectangular shape in a plane view. In FIG. 1, a longitudinal direction of the outer package 30 is a right-left direction. The outer package 30 has a housing portion 31 and a cover portion 32.

The housing portion 31 is a member having a bottomed rectangular cylindrical shape of which one plane is opened, and houses the power generation element 20 therein.

The cover portion 32 is a tabular member having a shape according to the opened plane of the housing portion 31, and is joined to the housing portion 31 in a state where the opened plane of the housing portion 31 is closed. In the cover portion 32, an injection hole 33 via which electrolyte is injected is formed between parts where the external terminals 50 are inserted, as discussed later.

The injection hole 33 is a hole penetrating through a plate surface of the cover portion 32. The injection hole 33 is a generally round-shaped hole in a plane view and has different inside diameters on an outer side and an inner side of the cover portion 32. The injection hole 33 is formed such that an inside diameter of an upper side (the outer side) is larger than an inside diameter of a bottom side (the inner side), and a stepped portion is formed in a middle portion between the upper side and the bottom side.

Note that, the battery in the present embodiment is configured as a square battery having an outer package being formed in a bottomed squarely cylindrical shape, but is not limited to this. For example, the battery in the present embodiment is applicable to a cylindrical battery having an outer package formed in a bottomed cylindrical shape.

The cap 40 is configured to seal the injection hole 33. The cap 40 is formed generally in the same shape as the upper side of the injection hole 33. The cap 40 is placed on the stepped portion, and an outer peripheral portion of the cap 40 is joined to the cover portion 32 by laser beam welding.

The external terminal 50 is disposed in a state where a part thereof projects from an outer side surface 32b of the cover portion 32 toward an upper side (an outer side) of the battery 10. The external terminal 50 is electrically connected to the positive electrode or the negative electrode of the power generation element 20 via a collector terminal 51. The external terminal 50 is fixed to the cover portion 32 in an insulation manner such that a fixing member 34 is fitted to an outer peripheral surface of the external terminal 50 with insulating members 52, 53 being provided therebetween. The external terminal 50 and the collector terminal 51 function as an electric current path via which electric power to be accumulated in the power generation element 20 is taken outside or via which electric power is taken into the power generation element 20 from its outside. The collector terminal 51 is connected to the positive plate or the negative plate of the power generation element 20. As a material for the collector terminal 51, it is possible to use aluminum for a positive electrode side and copper for a negative electrode side, for example.

Screw thread machining is performed by thread rolling on that part of the external terminal 50 which projects toward the outer side of the battery 10, so that a bolt portion is formed. At the time of actual use of the battery 10, bus bars, a connecting terminal of an external device, and the like are fastened and fixed to the external terminal 50 by use of the bolt portion. At the time of the fastening and fixing, a fastening torque is applied to the external terminal 50 and an external force is given thereto in an axial direction by the screw thread fastening. In view of this, it is preferable to employ a high-strength material such as iron, as a material for the external terminals 50.

Next will be described the manufacturing method of the present embodiment.

In the manufacturing method, after a positive electrode mixture and a negative electrode mixture are applied to a surface of a positive electrode collector and a surface of a negative electrode collector respectively by use of a coating machine such as a die coater, each mixture is dried. Then, in the manufacturing method, press machining is performed on the mixture on the surface of the collector, so as to form a positive electrode mixture layer and a negative electrode mixture layer on the surfaces of the collectors respectively.

In the manufacturing method, an electrode body is formed by laminating or winding the positive electrode and the negative electrode manufactured in such steps, and a separator. Then, in the manufacturing method, the external terminals 50, the collector terminals 51, and the like integrated with the cover portion 32 of the outer package 30 are connected to the electrode body, and the electrode body is housed in the housing portion 31 of the outer package 30. After that, in the manufacturing method, the housing portion 31 of the outer package 30 is joined to the cover portion 32 by welding, so as to be sealed.

At the time when the outer package 30 is sealed, the injection hole 33 is not sealed by the cap 40 (see the injection hole 33 illustrated on the upper left of FIG. 2). Accordingly, at this point, the injection hole 33 is opened outwardly. That is, the injection hole 33 of the present embodiment can be considered as an opening that is formed in a battery container according to the present invention so as to be opened outwardly.

As illustrated in FIG. 2, in the manufacturing method, after the outer package 30 is sealed, an electrolyte E is injected from the injection hole 33. At this time, in the manufacturing method, the injection of the electrolyte E is performed by use of a sealing member 110 or the like as illustrated in FIG. 3A.

As illustrated in FIG. 3A, the sealing member 110 is a generally cylindrical member having an inside diameter that is generally the same as an inside diameter of a bottom side of the injection hole 33 and having an outside diameter that is smaller than an inside diameter of an upper side of the injection hole 33. The sealing member 110 communicates with a container which accumulates the electrolyte E, via a pipe, a pump, and the like.

In the manufacturing method, such a sealing member 110 is pushed against the stepped portion of the injection hole 33, so as to seal the injection hole 33 (see a white arrow in FIG. 3A). Then, in the manufacturing method, the pump is driven so as to inject the electrolyte E into the outer package 30 via the pipe, the sealing member 110, and the like.

Figure 3B:
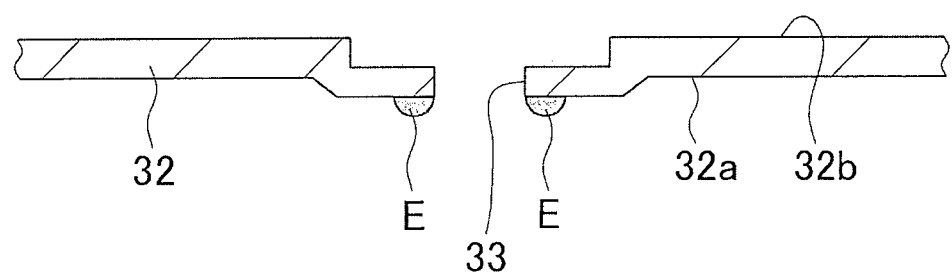
FIG. 3B illustrates a cover portion after the electrolyte is injected.

At this time, the electrolyte E enters the outer package 30 along an inner peripheral surface of the sealing member 110, so that most of the electrolyte E drops from the cover portion 32 toward a bottom face of the outer package 30 and part thereof is attached to a peripheral part of the injection hole 33 on an inner side surface 32a of the cover portion 32. Accordingly, as illustrated in FIG. 3B, the part of the electrolyte E is attached to the peripheral part of the injection hole 33 on the inner side surface 32a of the cover portion 32, even after the injection of the electrolyte E is finished.

As illustrated in FIG. 2, after the electrolyte E is injected into the outer package 30, helium He is introduced into the outer package 30. Details about a procedure of the introduction of the helium He will be described later.

After the helium He is introduced into the outer package 30, the injection hole 33 is sealed. At this time, the cap 40 is placed on the injection hole 33 and laser is radiated along an outer edge of the cap 40 by a laser welder, so as to seal the injection hole 33 (see a white triangle illustrated in FIG. 2).

After the injection hole 33 is sealed, leakage of the helium He from the outer package 30, that is, a sealing degree of the outer package 30 is inspected.

At this time, the outer package 30 is housed in a chamber 141, and vacuum drawing is performed on the chamber 141. After that, an amount of the helium He leaking from the outer package 30 per unit time is checked by use of a commercial helium leak checker.

Hereby, it is determined whether or not there is leakage from the outer package 30, based on an output value from the helium leak checker.

Thus, in the present embodiment, a detection gas introduced into the outer package 30 is the helium He.

Note that the detection gas is not limited to helium as used in the present embodiment, but it is preferable to employ helium. The reason is as follows: when helium is employed, it is possible to prevent affection on battery performance, and it is also possible to detect leakage from a microscopic hole because helium has a small molecular diameter. Thus, it is possible to obtain advantageous effects in comparison with other detection gases in the manufacturing process of a battery. Further, in the manufacturing method, when helium is introduced, a gas mixture of helium with other gases may be introduced.

After the sealing degree of the outer package 30 is inspected, inspections or the like of an initial charge and a voltage of the battery 10 are performed. Thus, the sealed battery 10 is manufactured.

Next will be described the procedure of the introduction of the helium He.

Note that, in the following description, the outer package 30 is set in an environment in the atmosphere.

Figure 4:
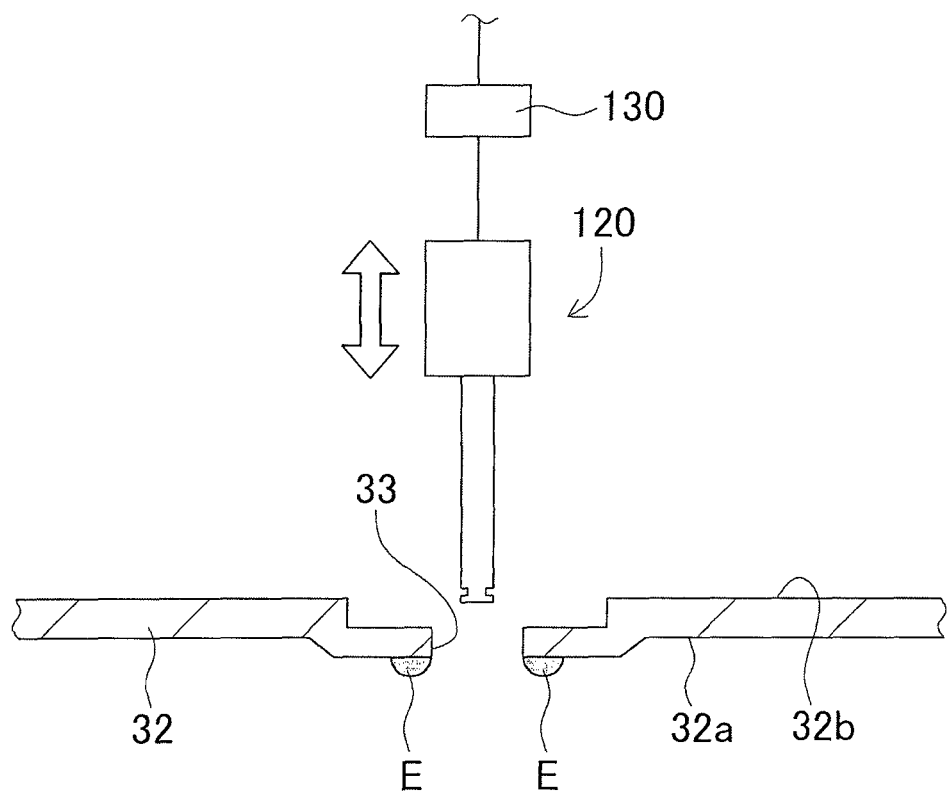
FIG. 4 is an explanatory view illustrating a supply nozzle and a proportional flow valve.

In the manufacturing method of the present embodiment, the helium He is introduced by use of a supply nozzle 120, a proportional flow valve 130, and the like as illustrated in FIG. 4. Initially described are configurations of the supply nozzle 120 and the proportional flow valve 130.

As illustrated in FIG. 4, the supply nozzle 120 is disposed above the injection hole 33, and is connected to a predetermined helium supply source via a pipe or the like. A bottom face of a tip portion (a lower end portion) of the supply nozzle 120 is closed, and right and left sides thereof in FIG. 4 are opened. Those parts of the supply nozzle 120 which are opened are formed as injection ports to inject the helium He.

That is, the supply nozzle 120 of the present embodiment is configured to be able to inject the helium He along right and left directions in FIG. 4.

Such a supply nozzle 120 is configured to be able to move up and down by being connected to a cylinder or the like.

The proportional flow valve 130 is provided between the helium supply source and the supply nozzle 120. The proportional flow valve 130 includes a valve body configured to open or close a helium supply passage from the helium supply source to the supply nozzle 120. The proportional flow valve 130 is electrically connected to a predetermined controller, for example, and is configured to be able to adjust an opening degree of the valve body based on an electrical signal from the controller.

The helium He is injected at a large pressure when the opening degree of the valve element of the proportional flow valve 130 is large, while the helium He is injected at a small pressure when the opening degree of the valve element of the proportional flow valve 130 is small. That is, the proportional flow valve 130 is configured to be able to adjust a magnitude of an injection pressure of the helium He within a determined pressure range.

In the manufacturing method, the helium He is introduced in the following procedure.

Figure 5A:
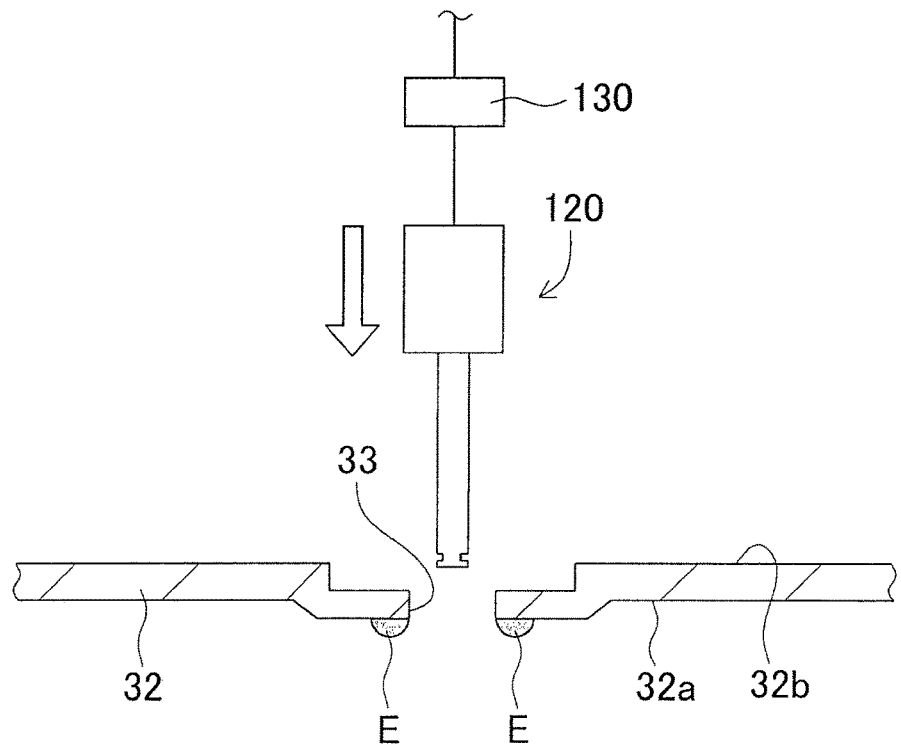
FIG. 5A illustrates the supply nozzle in the middle of inserting the supply nozzle into an injection hole.
Figure 5B:
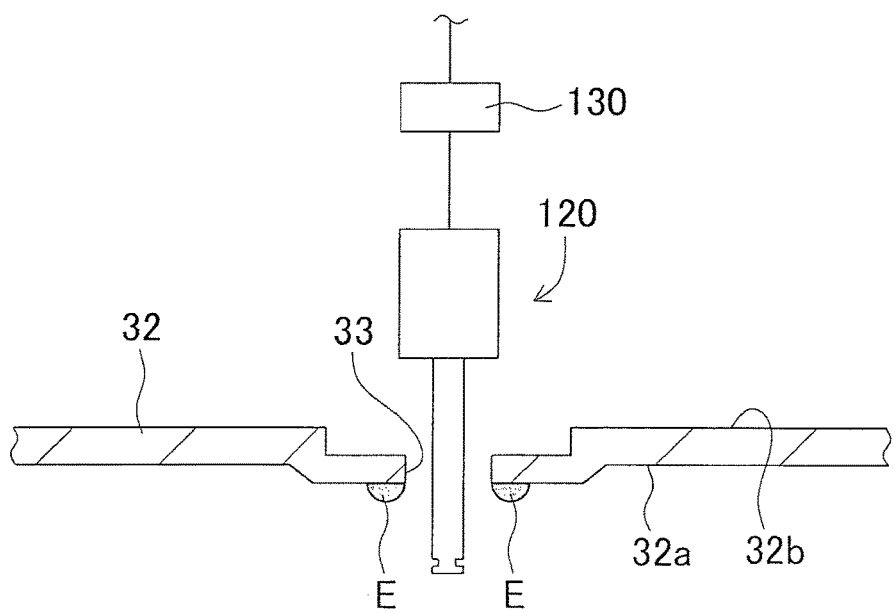
FIG. 5B illustrates the supply nozzle after the insertion.

Initially, as illustrated in FIGS. 5A, 5B, the supply nozzle 120 is moved down to a position where the injection ports of the supply nozzle 120 are placed between the injection hole 33 and the electrode body, so that the supply nozzle 120 is inserted into the injection hole 33. At this time, a path where the helium He flows is closed by the proportional flow valve 130. Accordingly, the helium He is not injected when the supply nozzle 120 is inserted.

That is, the injection pressure (a gauge pressure) of the helium He is set to zero, and then, the supply nozzle 120 is inserted.

At this time, the injection ports of the supply nozzle 120 face right and left surfaces (see FIG. 1) of the outer package 30.

Figure 7:
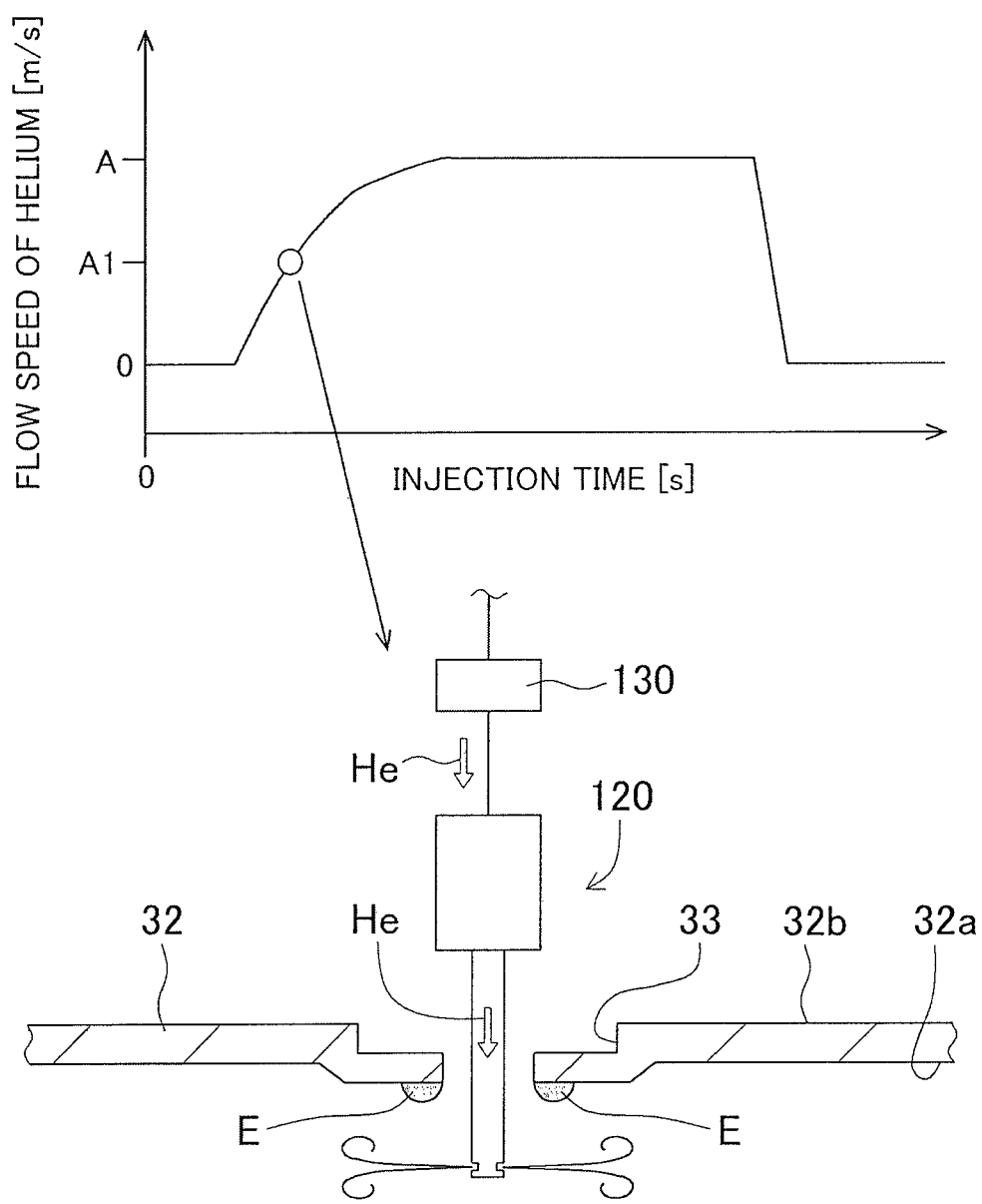
FIG. 7 is an explanatory view illustrating the supply nozzle when an injection pressure of the helium is increased to a first pressure at a first stage.

After the supply nozzle 120 is inserted into the injection hole 33, the valve body of the proportional flow valve 130 is opened so as to open the helium supply passage from the helium supply source to the supply nozzle 120, thereby starting injection of the helium He from the supply nozzle 120 (see FIG. 7).

That is, after the supply nozzle 120 is inserted, the injection pressure (the gauge pressure) of the helium He is increased to more than zero.

Hereby, the helium He is injected to the right and left sides of the outer package 30 so that the helium He reaches deep inside the outer package 30.

In the manufacturing method of the present embodiment, the injection pressure of the helium He is increased to a predetermined injection pressure, then is injected at the predetermined injection pressure for a given time. A magnitude of the predetermined injection pressure is set in advance to become a large pressure to such an extent that the helium He can reach the right and left surfaces of the outer package 30.

Such a magnitude of the predetermined injection pressure is set based on a shape (strictly, a shape of an internal space of the outer package 30) of the outer package 30 and a position of the injection hole 33. This allows the helium He to be injected vigorously to reach deep inside the outer package 30.

Hereinafter, the magnitude of the predetermined injection pressure at the time of injecting the helium He for a given time is referred to as "predetermined pressure."

In the manufacturing method of the present embodiment, after the supply nozzle 120 is inserted into the injection hole 33, the injection of the helium He from the supply nozzle 120 is started at a pressure smaller than the predetermined pressure, and subsequently, the injection pressure of the helium He is increased by stages until the injection pressure of the helium He reaches the predetermined pressure. In the manufacturing method, the helium He is hereby injected at a flow speed A.

Here, that the injection pressure of the helium He is increased by stages indicates the following: after the injection of the helium He is started by adjusting the injection pressure of the helium He so as to inject the helium He at an injection pressure smaller than the predetermined pressure, the helium He is injected with the injection pressure of the helium He being increased by stages, and ultimately, the helium He is injected at the predetermined pressure.

In the manufacturing method of the present embodiment, as illustrated by a graph of a continuous line in FIG. 6, the opening degree of the valve body of the proportional flow valve 130 is increased gradually, so that the injection pressure of the helium He is increased at four stages, so as to gradually increase the flow speed of the helium He (see flow speeds A1 to A3, A illustrated in FIG. 6).

Hereby, in comparison with a case where the injection of the helium He is started by adjusting the injection pressure of the helium He so that the helium He is injected at the predetermined pressure as illustrated by a graph of an alternate long and short dashes line in FIG. 6, an increase degree of the injection pressure of the helium He, that is, that flow speed of the helium He which is an inclination of the graph illustrated in FIG. 6 is made gradual.

Note that, in the graphs illustrated in FIG. 6, a time at which the supply nozzle 120 is started to move down is considered as an injection time 0. Accordingly, in the graphs illustrated in FIG. 6, a linear part before the flow speed of the helium He increases (a straight line on the left side, out of straight lines parallel to a horizontal axis on right and left sides of the graph) indicates the flow speed of the helium He at the time when the supply nozzle 120 is moved down, that is, a state where the injection pressure (the gauge pressure) of the helium He is zero and the flow speed of the helium He is zero. Further, in the present embodiment, an injection pressure of the helium He at a fourth stage is the predetermined pressure at the time when the helium He is injected for a given time.

As illustrated in FIG. 7, the injection of the helium He is started by increasing the injection pressure of the helium He so that the helium He is injected at a first pressure at a first stage.

The first pressure at the first stage which is an injection pressure at the time of injection start has a magnitude that is about a half of the predetermined pressure. Accordingly, a strength of the helium injection from the supply nozzle 120 at the time when the injection pressure of the helium He is increased to the first pressure at the first stage is weak. That is, in the manufacturing method of the present embodiment, the helium He at a relatively low pressure is gradually supplied into the outer package 30. A pressure inside the outer package 30 is an atmospheric pressure before the injection of the helium He is started.

Accordingly, when the injection pressure of the helium He is increased to the first pressure at the first stage, the helium He is injected in a state where a pressure difference between the pressure inside the outer package 30 and the injection pressure of the helium He is small. That is, when the injection pressure of the helium He is increased to the first pressure at the first stage, the flow speed of the helium He injected from the supply nozzle 120 is increased gradually, that is, the flow speed is increased not suddenly (see a flow speed A1 illustrated in FIG. 7).

Figure 8:
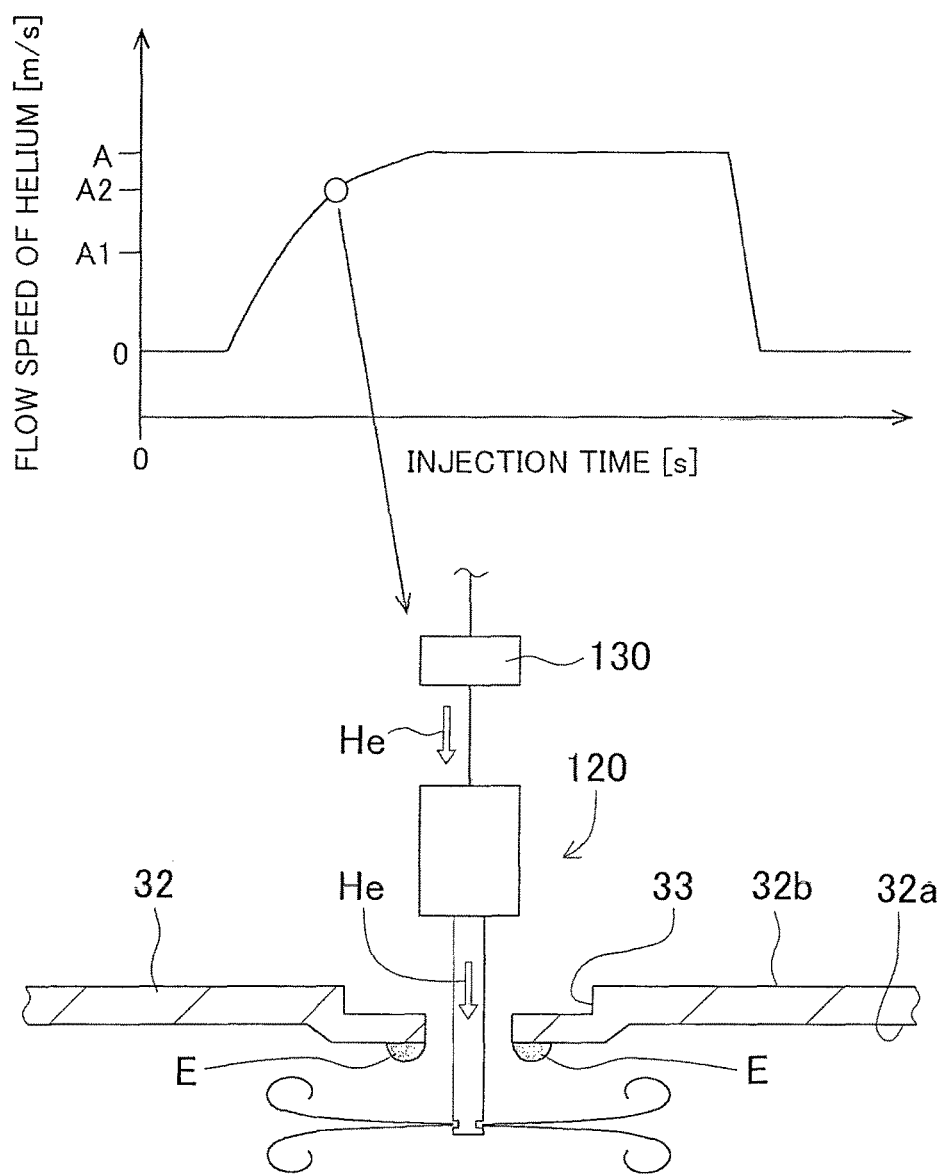
FIG. 8 is an explanatory view illustrating the supply nozzle when the injection pressure of the helium is increased to a second pressure at a second stage.

Then, as illustrated in FIG. 8, in the manufacturing method, the injection pressure of the helium He is increased so that the helium He is injected at a second pressure at a second stage.

The second pressure at the second stage is larger than the first pressure at the first stage and slightly smaller than the predetermined pressure. That is, in the manufacturing method, the strength of the injection of the helium He is increased. The pressure inside the outer package 30 becomes slightly larger than the atmospheric pressure due to the helium injection performed when the injection pressure of the helium H is increased to the first pressure at the first stage.

That is, in the manufacturing method, the injection pressure of the helium He is increased to the first pressure at the first stage and then to the second pressure at the second stage, so that an injection time necessary to increase the injection pressure of the helium He is made longer, so as to wait until the pressure inside the outer package 30 is increased.

Figure 9:
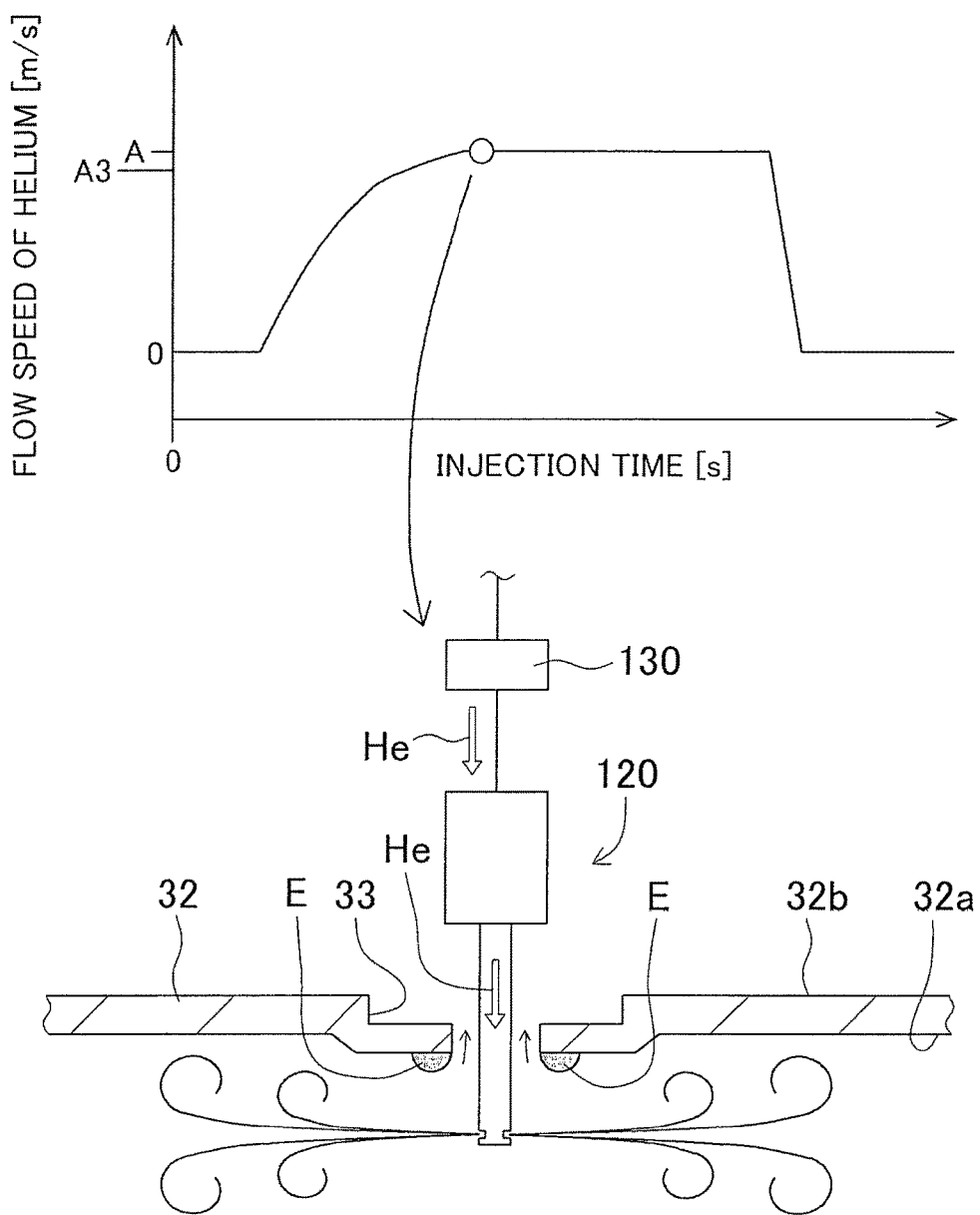
FIG. 9 is an explanatory view illustrating the supply nozzle when the injection pressure of the helium is increased to a predetermined pressure.

Accordingly, in the manufacturing method, even when the injection pressure of the helium He is increased to the second pressure at the second stage, it is possible to inject the helium He in a state where the pressure difference between the pressure inside the outer package 30 and the injection pressure of the helium He is small. That is, when the injection pressure of the helium He is increased from the first pressure at the first stage to the second pressure at the second stage, the flow speed of the helium He injected from the supply nozzle 120 is increased gradually (see a flow speed A2 illustrated in FIG. 8). The same applies to the time when the injection pressure of the helium He is increased from the second pressure at the second stage to a third pressure at a third stage, and to the time when the injection pressure of the helium He is increased from the third pressure at the third stage to the predetermined pressure as illustrated in FIG. 9 (see flow speeds A3, A illustrated in FIG. 9).

According to the configuration, it is possible to increase the injection pressure of the helium He to the predetermined pressure without increasing the pressure difference between the pressure inside the outer package 30 and the injection pressure of the helium He, that is, without excessively increasing the flow speed of the injected helium He. Accordingly, it is possible to slow a flow speed of an airflow going outside via the injection hole 33, which air flow is caused inside the outer package 30 due to the injection of the helium He (see an arrow shown inside the injection hole 33 in FIG. 9).

Thus, in the manufacturing method, even in a case where the electrolyte E is attached to the peripheral part of the injection hole 33 on the inner side surface 32a of the cover portion 32, it is possible to prevent the electrolyte E from being caught by the airflow and being attached to the peripheral part of the injection hole 33 on the outer side surface 32b of the cover portion 32, when the injection pressure of the helium He is increased.

After the injection pressure of the helium He is increased to the predetermined pressure, the helium He is injected for a given time in a state where the injection pressure of the helium He is maintained at the predetermined pressure.

After the helium He is injected for a given time at the predetermined pressure, the injection of the helium He is stopped. That is, in the manufacturing method, the valve body of the proportional flow valve 130 is closed and the magnitude of the injection pressure (the gauge pressure) of the helium He is returned to zero. Then, the supply nozzle 120 is moved up back to a height position before the helium introduction is performed. In the manufacturing method, such a series of operations are performed to sequentially introduce the helium He into the outer packages 30 carried by a predetermined carrier device.

By injecting the helium He from the supply nozzle 120 at the predetermined pressure (the predetermined injection pressure) as such, an introduction step of introducing the helium He into the outer package 30 is performed.

When the helium He is injected at the predetermined pressure for a given time, the pressure inside the outer package 30 is large to some extent due to the helium injection at the time when the injection pressure of the helium He is increased by stages. Accordingly, when the helium He is injected at the predetermined pressure for a given time, the flow speed of the helium He does not become too fast, so that the flow speed of the airflow is kept slow.

Thus, in the manufacturing method, it is possible to prevent the electrolyte E attached to the peripheral part of the injection hole 33 on the inner side surface 32a of the cover portion 32 from being caught by the airflow and being attached to the peripheral part of the injection hole 33 on the outer side surface 32b of the cover portion 32, even when the helium He is injected at the predetermined pressure for a given time. That is, in the manufacturing method of the present embodiment, even after the helium He is introduced, the electrolyte E is kept attached to the peripheral part of the injection hole 33 on the inner side surface 32a of the cover portion 32.

Figure 10A:
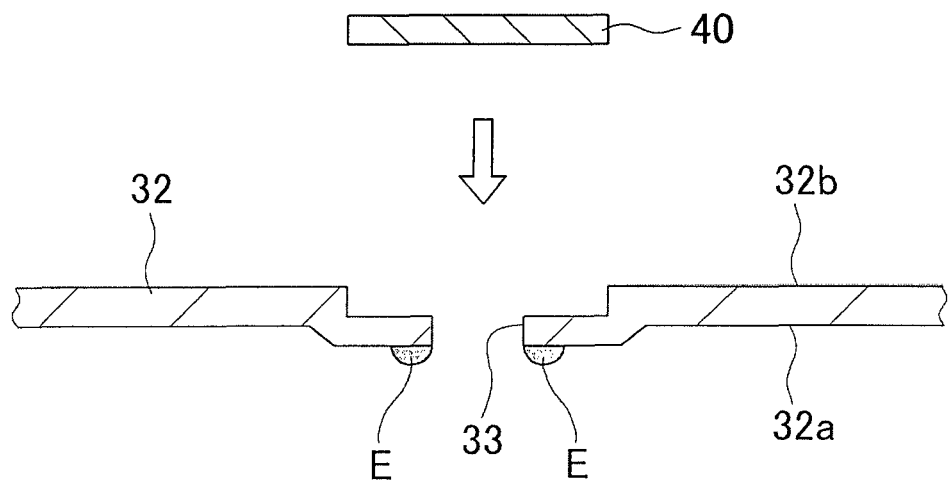
FIG. 10A illustrates a state where a cap is placed on the injection hole.
Figure 10B:
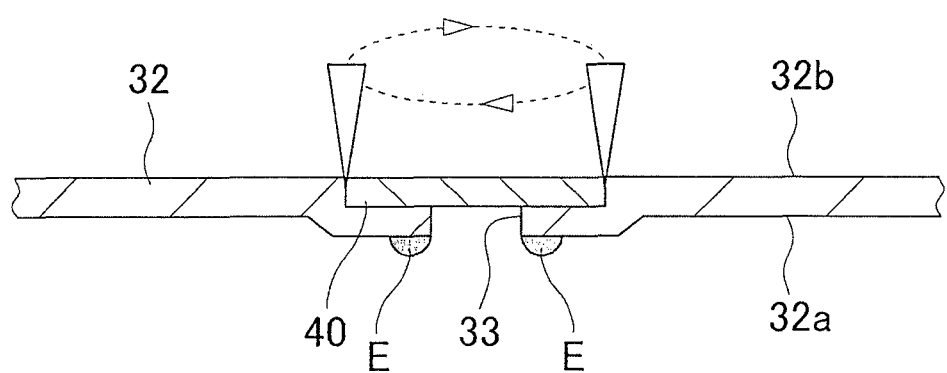
FIG. 10B illustrates a state where laser beam welding is performed on the cap.

Hereby, as illustrated in FIG. 10, it is possible to seal the injection hole 33 in a state where the electrolyte E is not attached to the peripheral part of the injection hole 33 on the outer side surface 32b of the cover portion 32.

Accordingly, it is possible to prevent the electrolyte E attached to the peripheral part of the injection hole 33 on the outer side surface 32b of the cover portion 32 from being vaporized due to heat of laser and rapidly expanding, when the injection hole 33 is sealed. In view of this, it is possible to prevent a molten material of the cover portion 32 from bumping due to the vaporized electrolyte E going outside from a melting portion. That is, it is possible to stabilize weld penetration of the cap due to the laser.

According to the configuration, the manufacturing method of the present embodiment is able to prevent occurrence of poor welding.

As described above, the predetermined pressure is large to such an extent that the helium He can reach the right and left surfaces of the outer package 30. Accordingly, the manufacturing method is able to cause the helium He to reach deep inside the outer package 30, thereby making it possible to reduce a leakage of the helium He.

Here, as a technique to prevent occurrence of poor welding, there is such a technique in which the supply nozzle 120 is inserted into the injection hole 33 while the helium He is injected, and the electrolyte E attached to the peripheral part of the injection hole 33 on the inner side surface 32a of the cover portion 32 is blown off deep inside the outer package 30. In this case, most of the helium He injected before the supply nozzle 120 is inserted is not introduced into the outer package 30.

On the other hand, in the manufacturing method of the present embodiment, the helium He is injected after the supply nozzle 120 is inserted. This makes it possible to reduce an amount of consumption of the helium He, in comparison with a case where the supply nozzle 120 is inserted while the helium He is injected.

That is, in the manufacturing method, it is possible to reduce a ratio of batteries that cannot be shipped due to poor welding and the manufactured batteries, and it is possible to introduce the helium He into the outer package 30 without any waste, thereby making it possible to effectively reduce a cost required for the manufacture of the battery 10.

Next will be described a result of an evaluation on the peripheral part of the injection hole 33 on the outer side surface 32b of the cover portion 32.

Figure 11:
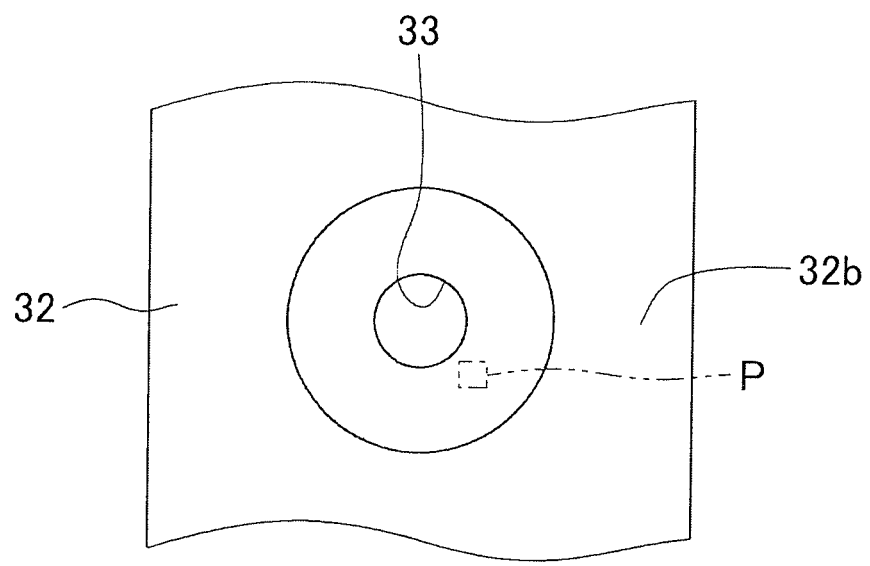
FIG. 11 is a view illustrating a state where a peripheral part of the injection hole on an outer side surface of a cover portion is evaluated.

As illustrated in FIG. 11, the evaluation was performed such that the helium He was introduced after the electrolyte E was injected to the outer package 30, and an adhesion state of the electrolyte E was checked by SEM (Scanning Electron Microscope) (see a checking part P shown by an alternate long and two short dashes line in FIG. 11).

Figure 12A:
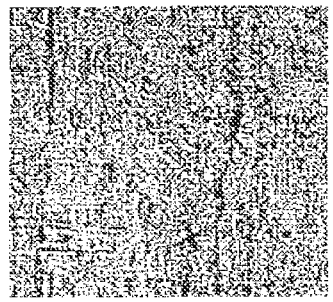
FIG. 12A illustrates a result of an evaluation on the peripheral part of the injection hole on the outer side surface of the cover portion in a case where the helium is injected by use of the manufacturing method of the present embodiment.

FIG. 12A shows a check result by the SEM at the time when the helium He was introduced into the outer package 30 by increasing the injection pressure of the helium He by stages. That is, FIG. 12A corresponds to an evaluation result at the time when the helium He was introduced by use of the manufacturing method of the present embodiment.

Figure 12B:
FIG. 12B illustrates a result of an evaluation on the peripheral part of the injection hole on the outer side surface of the cover portion in a case where the helium is injected without increasing the injection pressure of the helium by stages.
Figure 14:
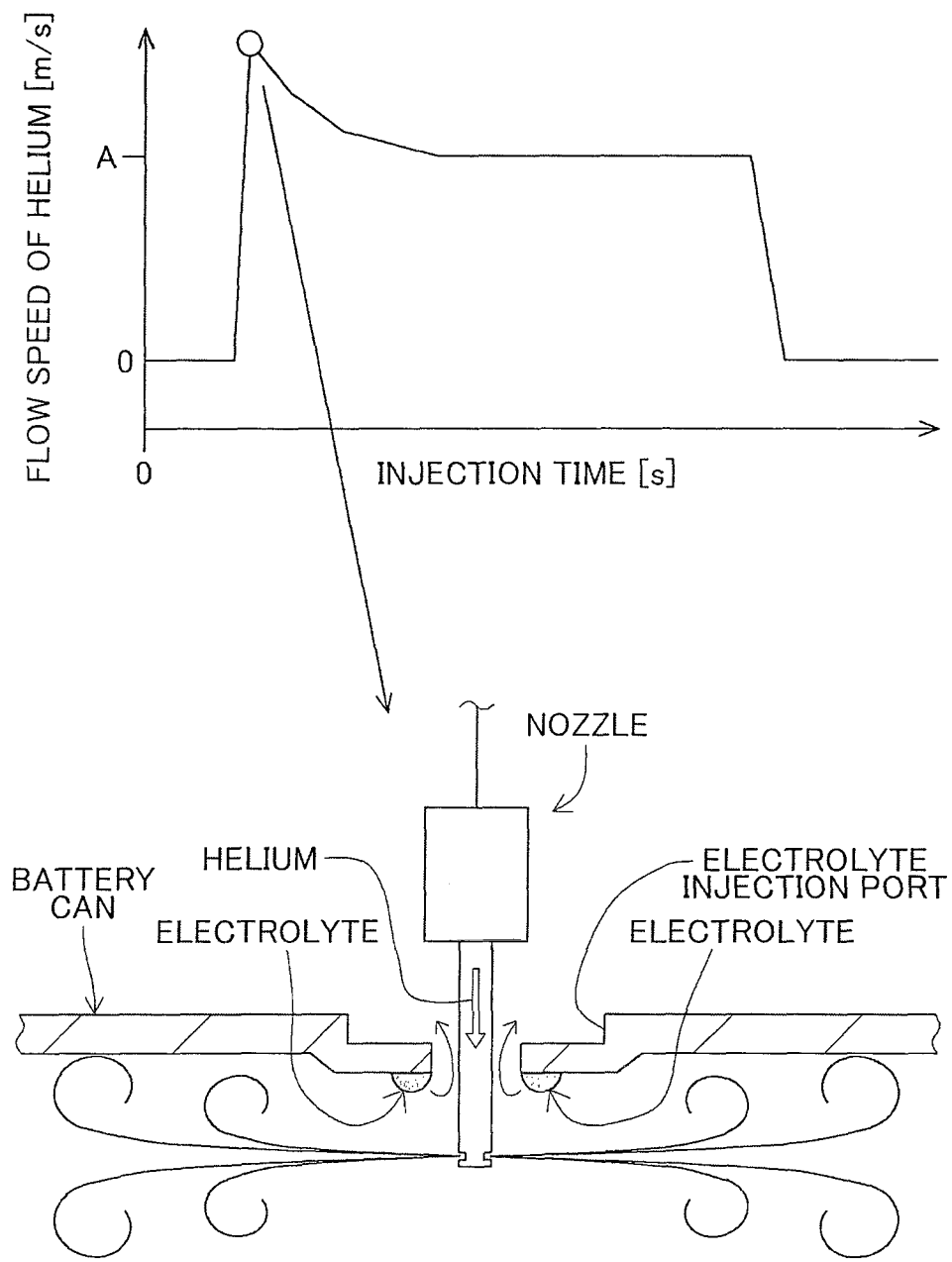
FIG. 14 is a view illustrating a state where helium is injected without increasing an injection pressure of the helium by stages, after a supply nozzle is inserted into an injection hole.

FIG. 12B shows a check result by the SEM on a peripheral part (a checking part P) of the injection hole 33 at the time when the helium He was introduced into the outer package 30 in such a manner that the injection of the helium He was started by adjusting the injection pressure of the helium He without increasing the injection pressure of the helium He by stages, that is, the helium He was injected at the predetermined pressure (see FIG. 14). That is, FIG. 12B corresponds to an evaluation result at the time when the helium He was introduced by use of a conventional technique. The evaluation was performed such that a magnetic valve was provided between the supply nozzle 120 and the helium supply source in the present embodiment and the helium He was injected by opening the magnetic valve at the time of helium injection without increasing the injection pressure of the helium He.

As illustrated in FIG. 12A, in a case where the injection pressure of the helium He was increased by stages, no attachment was observed in the peripheral part of the injection hole 33 on the outer side surface 32b of the cover portion 32.

On the other hand, as illustrated in FIG. 12B, in a case where the injection pressure of the helium He was not increased by stages, a component of the electrolyte E was observed in the peripheral part of the injection hole 33 on the outer side surface 32b of the cover portion 32.

Figure 15A:
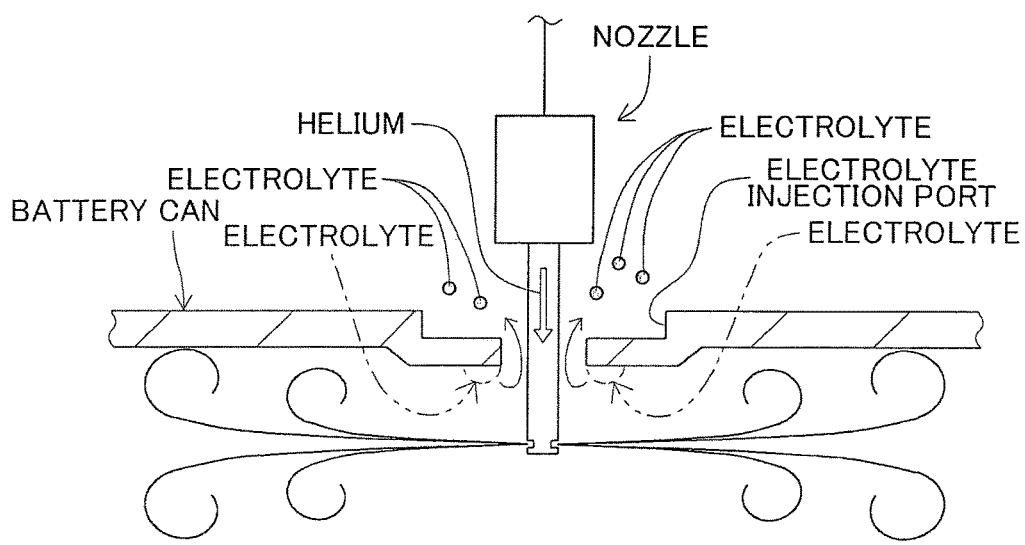
FIG. 15A illustrates a state where electrolyte attached to a peripheral part of an electrolyte injection port on an inner side surface of a battery can is blown off, in which state the electrolyte is caught by fast airflow.
Figure 15B:
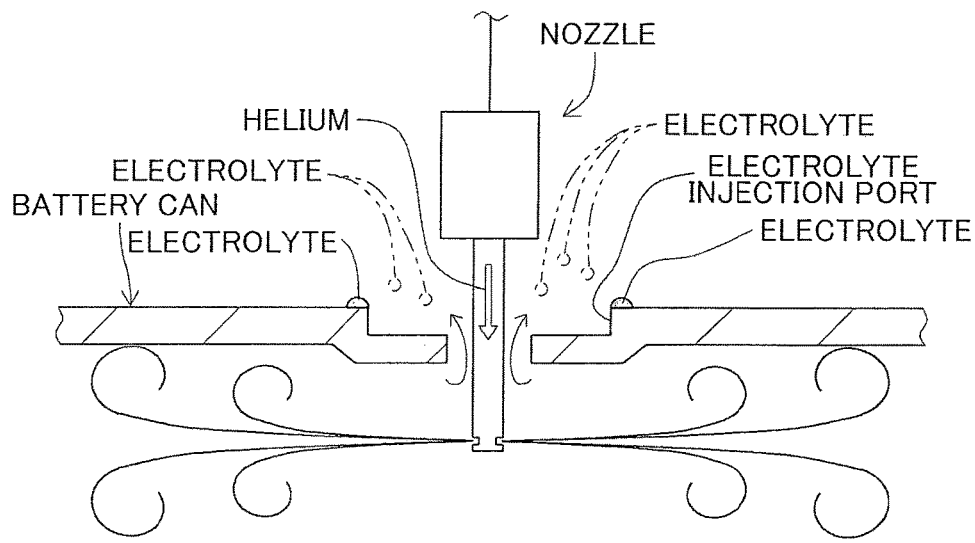
FIG. 15B illustrates a state where the electrolyte is blown off to the peripheral part of the electrolyte injection port on an outer side surface of the battery can.

This is presumably because, when the injection pressure of the helium He is increased, a pressure difference between the pressure inside the outer package 30 and the injection pressure of the helium He was too large. That is, in this case, the injection pressure of the helium He is suddenly increased before the pressure inside the outer package 30 is increased due to the injection of the helium He, so that the flow speed of the helium He becomes fast suddenly, thereby resulting in that the flow speed of the airflow caused due to the helium injection becomes fast. Accordingly, in this case, it is considered that the electrolyte E attached to the peripheral part of the injection hole 33 on the inner side surface 32a of the cover portion 32 was caught by such fast airflow, and the electrolyte E was attached to the peripheral part of the injection hole 33 on the outer side surface 32b of the cover portion 32 (see FIG. 15).

As is apparent from the above evaluation results, in the manufacturing method of the present embodiment, the helium He is introduced into the outer package 30 by increasing the injection pressure of the helium He by stages, thereby making it possible to prevent the electrolyte E from being attached to the peripheral part of the injection hole 33 on the outer side surface 32b of the cover portion 32. Accordingly, the manufacturing method is able to prevent occurrence of poor welding.

Figure 13A:
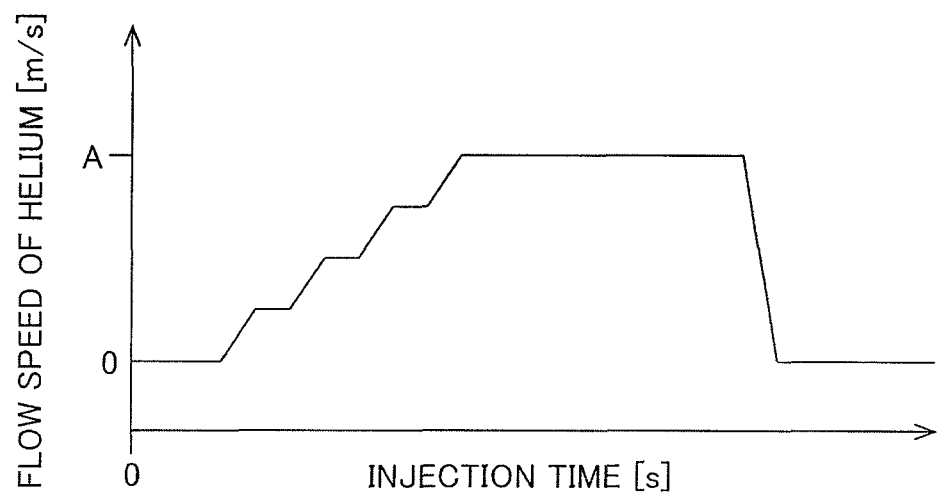
FIG. 13A illustrates a relationship between an injection time and a flow speed in a first modified embodiment.

Note that the injection pressure of the helium He may be increased by stages (in a step-by-step manner) as illustrated by a graph of a continuous line in FIG. 13A.

That is, as illustrated in a first modified embodiment illustrated in FIG. 13A, every time the injection pressure of the helium He is increased by stages, the helium He may be injected for a given time at the injection pressure thus increased by stages in each stage. In this case, the flow speed of the helium He is maintained at a given flow speed at a stage before a flow speed A at the time when the helium He is injected at the predetermined pressure.

Figure 13B:
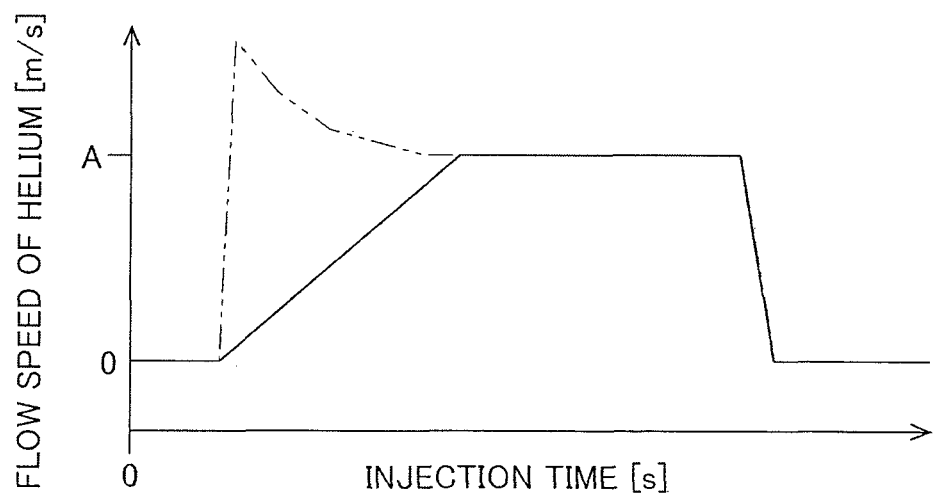
FIG. 13B illustrates a relationship between an injection time and a flow speed in a second modified embodiment.

Further, as illustrated in a second modified embodiment illustrated in FIG. 13B, the manufacturing method may be performed such that the number of stages before the injection pressure of the helium He is increased to the predetermined pressure is increased, and the helium He is injected so that a pressure increases generally constantly (a pressure increasing amount per an unit time becomes generally uniform) until the injection pressure of the helium He reaches the predetermined pressure. In this case, the increasing amount of the flow speed of the helium He per unit time becomes generally uniform up to the flow speed A at which the helium is injected at the predetermined pressure. That is, in the graph in FIG. 13B, the flow speed is increased generally linearly up to the flow speed A.

Further, the injection pressure of the helium He may be increased at least at two stages of a pressure smaller than the predetermined pressure and the predetermined pressure, and the injection pressure of the helium is not necessarily increased at four stages like the present embodiment.

Note that injection directions of the helium is not necessarily the right and left directions. The helium may be injected toward those parts of the inner side surface of the outer package which are away from the injection hole. For example, the helium may be injected toward a deeper side on a plane of paper of FIG. 1 relative to the right and left directions in FIG. 1, or may be injected in a direction inclined toward a front side on the plane of paper in FIG. 1. Further, the injection direction of the helium may be a direction inclined toward up and down directions relative to the right and left directions.

The helium is not necessarily injected in two directions of the left direction and the right direction. For example, the helium may be injected only in one direction of the left direction or in one direction of the right direction.

Note that the technique to increase the injection pressure of the helium by stages is not limited to a technique using the proportional flow valve as used in the present embodiment.

The invention claimed is:

1. A sealed battery manufacturing method comprising:
   inserting a supply nozzle into an opening that is opened outwardly, the opening being formed in a battery container; and
   introducing a detection gas into the battery container in such a manner that injection of the detection gas from the supply nozzle is started at a first pressure smaller than a second predetermined injection pressure, and then an injection pressure of the detection gas is increased by stages, reaching and surpassing the second predetermined injection pressure, until the injection pressure of the detection gas reaches a third predetermined injection pressure, the third predetermined injection pressure being larger than the second predetermined injection pressure.

2. The sealed battery manufacturing method according to claim 1, wherein:
   the injection pressure of the detection gas is increased to the predetermined injection pressure in such a manner that a flow speed of the detection gas is increased gradually by increasing the injection pressure of the detection gas by a plurality of stages.

3. The sealed battery manufacturing method according to claim 2, wherein:
   every time the injection pressure of the detection gas is increased by stages, the injection of the detection gas is performed for a given time at the injection pressure increased by stages in each stage.

4. The sealed battery manufacturing method according to claim 1, wherein:
   the injection of the detection gas is performed generally at a uniform pressure change rate of the injection pressure until the injection pressure of the detection gas reaches the predetermined injection pressure.

5. The sealed battery manufacturing method according to claim 1, wherein:
   the supply nozzle is inserted into the opening in a state where the injection pressure of the detection gas is zero.

6. The sealed battery manufacturing method according to claim 1, wherein the first pressure is a non-zero pressure.

7. A sealed battery manufacturing method comprising:
  inserting a supply nozzle into an opening that is opened outwardly, the opening being formed in a battery container; and
  introducing a detection gas into the battery container in such a manner that injection of the detection gas from the supply nozzle is started at a pressure smaller than a predetermined injection pressure, and then an injection pressure of the detection gas is increased by stages until the injection pressure of the detection gas reaches the predetermined injection pressure, wherein
  the injection pressure of the detection gas is increased to the predetermined injection pressure in such a manner that a flow speed of the detection gas is increased gradually by increasing the injection pressure of the detection gas by a plurality of stages.

\* \* \* \* \*